United States Patent
Stroia et al.

(10) Patent No.: US 8,567,179 B2
(45) Date of Patent: Oct. 29, 2013

(54) ADAPTIVE OXYGEN SENSOR METHODS, SYSTEMS, AND SOFTWARE

(75) Inventors: Bradlee J. Stroia, Columbus, IN (US); Wei Lu, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 13/213,038

(22) Filed: Aug. 18, 2011

(65) Prior Publication Data
US 2011/0296817 A1     Dec. 8, 2011

Related U.S. Application Data

(63) Continuation of application No. 12/002,787, filed on Dec. 18, 2007, now abandoned.

(60) Provisional application No. 60/876,231, filed on Dec. 21, 2006.

(51) Int. Cl.
*F02M 25/06* (2006.01)

(52) U.S. Cl.
USPC ............................... 60/278; 60/276

(58) Field of Classification Search
USPC .................... 60/276, 277, 278, 295
See application file for complete search history.

(56) References Cited

U.S. PATENT DOCUMENTS

| | | | |
|---|---|---|---|
| 4,601,809 A | 7/1986 | Kitahara | |
| 4,727,849 A * | 3/1988 | Nishida et al. | 123/704 |
| 5,590,632 A | 1/1997 | Kato et al. | |
| 5,813,390 A | 9/1998 | Anamoto | |
| 5,858,063 A | 1/1999 | Cao et al. | |
| 6,073,083 A | 6/2000 | Schnaibel et al. | |
| 6,098,605 A | 8/2000 | Brooks | |
| 6,192,874 B1 | 2/2001 | Dekoninck et al. | |
| 6,200,458 B1 | 3/2001 | Brida et al. | |
| 6,216,083 B1 | 4/2001 | Ulyanov et al. | |
| 6,301,951 B1 | 10/2001 | Lenfers et al. | |
| 6,378,515 B1 | 4/2002 | Geyer | |
| 6,415,272 B1 | 7/2002 | Ulyanov | |
| 6,463,371 B1 | 10/2002 | Ulyanov et al. | |
| 6,609,060 B2 | 8/2003 | Ulyanov et al. | |
| 6,721,718 B2 | 4/2004 | Ulyanov | |
| 6,778,898 B1 | 8/2004 | Bidner et al. | |
| 6,860,100 B1 * | 3/2005 | Bidner et al. | 60/277 |
| 6,978,655 B2 | 12/2005 | Allmendinger | |
| 7,103,460 B1 | 9/2006 | Breed | |
| 2004/0149008 A1 | 8/2004 | Allmendinger | |
| 2005/0216175 A1 * | 9/2005 | Takahashi et al. | 701/109 |
| 2006/0027012 A1 | 2/2006 | Allmendinger | |

FOREIGN PATENT DOCUMENTS

| | | |
|---|---|---|
| EP | 0924514 A2 | 6/1999 |
| JP | 2003003903 A * | 1/2003 |
| WO | WO 2004/070374 A1 | 8/2004 |

OTHER PUBLICATIONS

Machine translation of JP 2003003903 A provided by USPTO Examiner on Feb. 1, 2011.

* cited by examiner

*Primary Examiner* — Thomas Denion
*Assistant Examiner* — Philip Eklem
(74) *Attorney, Agent, or Firm* — Krieg DeVault LLP

(57) ABSTRACT

One embodiment is a system operable to control entry of an oxygen sensor into a learning mode. Further embodiments, forms, objects, features, advantages, aspects, and benefits shall become apparent from the following description and drawings.

17 Claims, 9 Drawing Sheets

ADAPTIVE OXYGEN SENSOR METHODS, SYSTEMS, AND SOFTWARE

PRIORITY

The present application is a continuation of U.S. patent application Ser. No. 12/002,787 filed Dec. 18, 2007, which claims priority to U.S. Provisional Patent Application 60/876,231 filed Dec. 21, 2006. Both of these applications are incorporated herein by reference in the entirety for all purposes.

BACKGROUND

Internal combustion engines including diesel engines produce a number of combustion products including particulates, hydrocarbons ("HC"), carbon monoxide ("CO"), oxides of nitrogen ("NOx"), oxides of sulfur ("SOx") and others. Future diesel engines may be required to reduce these and other emissions. Aftertreatment systems may include oxygen sensors operable to measure or sense $O_2$ in exhaust in order to achieve desired efficiency and/or desired regeneration of aftertreatment system devices. There is a need for adaptive oxygen sensor methods, systems, and software.

SUMMARY

One embodiment is a system operable to control entry of an oxygen sensor into a learning mode. Further embodiments, forms, objects, features, advantages, aspects, and benefits shall become apparent from the following description and drawings.

DETAILED DESCRIPTION

Figure 1:
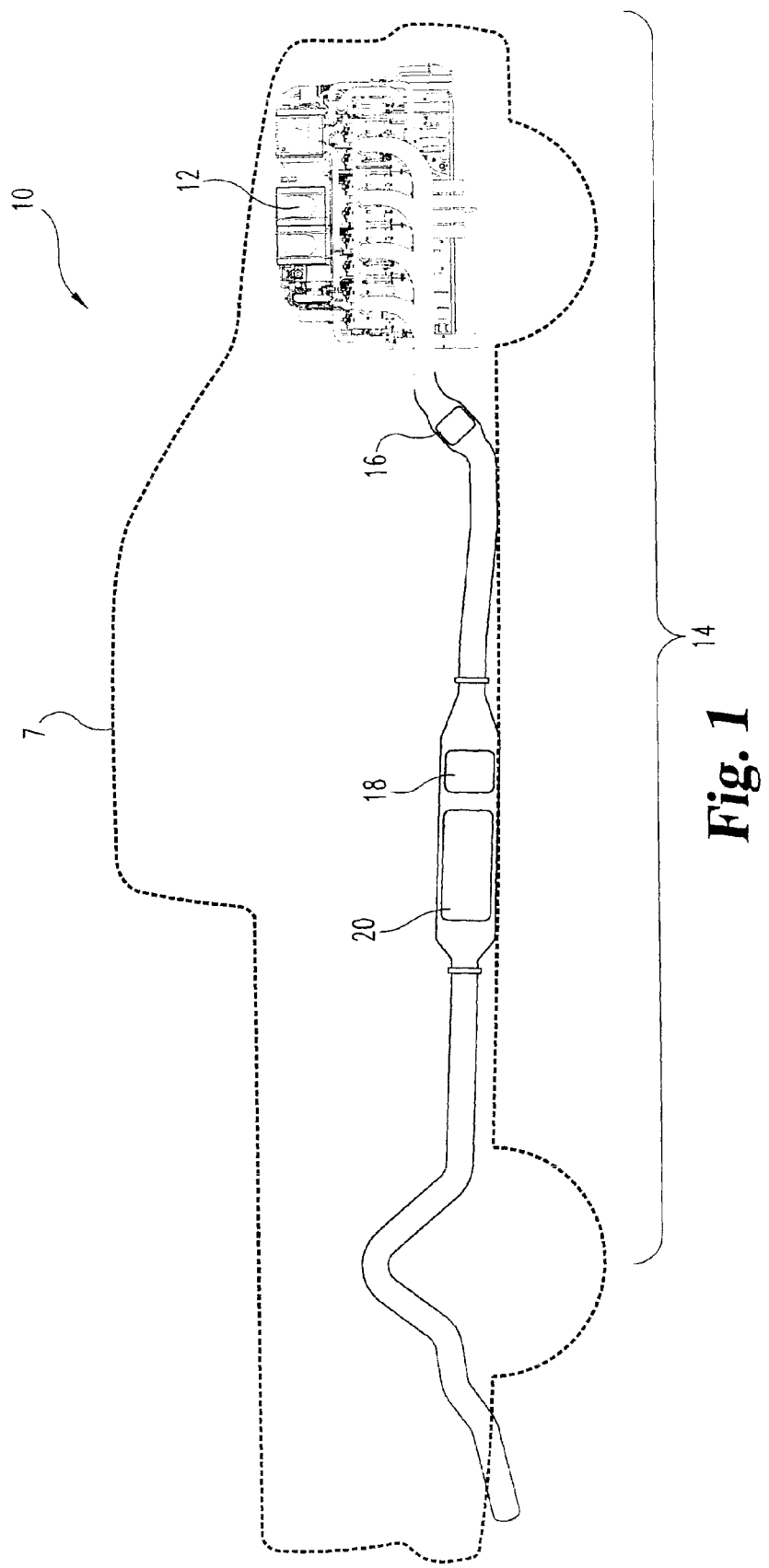
FIG. 1 is a schematic of an integrated engine-exhaust aftertreatment system.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

With reference to FIG. 1, there is illustrated a schematic of a preferred integrated engine-exhaust aftertreatment system 10 provided in a vehicle 7. The aftertreatment subsystem 14 includes a diesel oxidation catalyst 16 which is preferably a close coupled catalyst but could be other types of catalyst units such as a semi-close coupled catalyst, a NOx adsorber or lean NOx trap 18, and a diesel particulate filter 20 which are in flow series communication and receive and treat exhaust output from engine 12.

The diesel oxidation catalyst unit 16 is preferably a flow through device that includes a honey-comb like substrate. The substrate has a surface area that includes a catalyst. As exhaust gas from the engine 12 traverses the catalyst, CO, gaseous HC and liquid HC (unburned fuel and oil) are oxidized. The result of this process is that these pollutants are converted to carbon dioxide and water. During operation, the diesel oxidation catalyst unit 16 is heated to a desired temperature value.

The NOx adsorber 18 is operable to adsorb NOx and SOx emitted from engine 12 to reduce emissions into the atmosphere. The NOx adsorber 18 preferably includes catalyst sites which catalyze oxidation reactions and storage sites which store compounds. After NOx adsorber 18 reaches a certain storage capacity it may be regenerated through deNOx and/or deSOx processes.

The diesel particulate filter 20 may include one or more of several types of particle filters. The diesel particulate filter 20 is utilized to capture unwanted diesel particulate matter from the flow of exhaust gas exiting the engine 12. Diesel particulate matter includes sub-micron size particles found in diesel exhaust, including both solid and liquid particles, and may be classified into several fractions including: inorganic carbon (soot), organic fraction (often referred to as SOF or VOF), and sulfate fraction (hydrated sulfuric acid). The diesel particulate filter 20 may be regenerated at regular intervals by oxidizing the particulates trapped by the diesel particulate filter 20.

Figure 2:
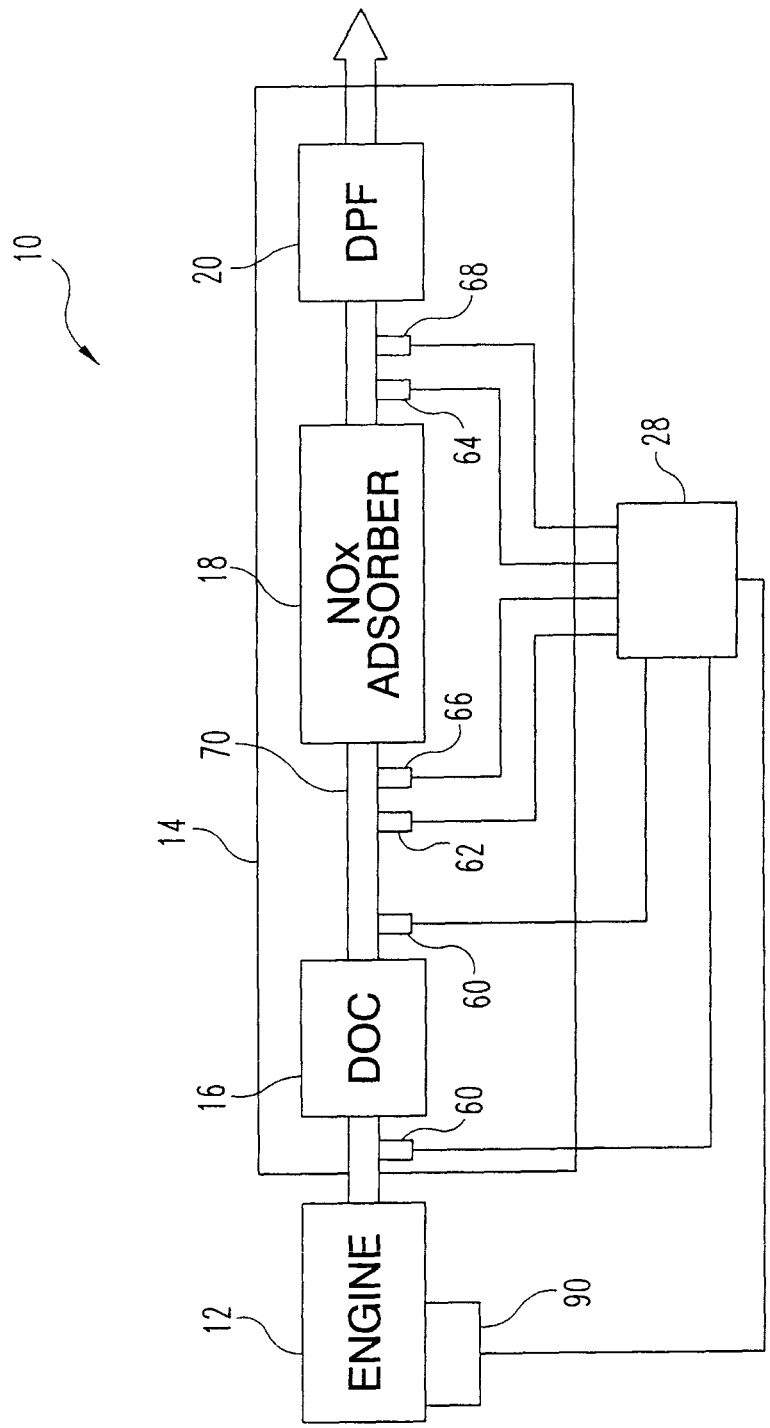
FIG. 2 is a schematic of an integrated engine-exhaust aftertreatment system operatively coupled with an engine control unit.

With reference to FIG. 2, there is illustrated a schematic of integrated engine-exhaust aftertreatment system 10 operatively coupled with an engine control unit ("ECU") 28. At least one temperature sensor 60 is connected with the diesel oxidation catalyst unit 16 for measuring the temperature of the exhaust gas as it enters the diesel oxidation catalyst unit 16. In other embodiments, two temperature sensors 60 are used, one at the entrance to or upstream from the diesel oxidation catalyst unit 16 and another at the exit or downstream from the diesel oxidation catalyst unit 16. Information from temperature sensor(s) 60 is provided to ECU 28 and used to calculate the temperature of the diesel oxidation catalyst unit 16.

A first NOx temperature sensor 62 senses the temperature of flow entering or upstream of NOx adsorber 18 and provides a signal to ECU 28. A second NOx temperature sensor 64 senses the temperature of flow exiting or downstream of NOx adsorber 18 and provides a signal to ECU 28. NOx temperature sensors 62 and 64 are used to monitor the temperature of the flow of gas entering and exiting the NOx adsorber 18 and provide signals that are indicative of the temperature of the flow of exhaust gas to the ECU 28. An algorithm may be used by the ECU 28 to determine the operating temperature of the NOx adsorber 18.

A first oxygen sensor 66 is positioned in fluid communication with the flow of exhaust gas entering or upstream from the NOx adsorber 18 and a second oxygen sensor 68 is positioned in fluid communication with the flow of exhaust gas exiting or downstream of the NOx adsorber 18. Oxygen sensors 66 and 68 could be a type of oxygen sensor, for example, a universal exhaust gas oxygen sensor or lambda sensor. Oxygen sensors 66 and 68 preferably include or are associated with heaters which heat them to a desired operating temperature. The oxygen sensors 66 and 68 are connected with the ECU 28 and generate electric signals that are indicative of the amount of oxygen contained in the flow of exhaust gas. The oxygen sensors 66 and 68 allow the ECU 28 to monitor air-fuel ratios also over a wide range thereby allowing ECU 28 to determine a value associated with the exhaust gas entering and exiting the NOx adsorber 18. Additional embodiments contemplate oxygen sensors positioned at other locations, for example, in a system including a saline NOx catalyst, oxygen sensors could be positioned to sense input and output flow of the saline NOx catalyst. The oxygen sensors 66 and 68 can enter into a learning mode or autozero mode. In such modes, the oxygen sensors can adaptively learn the appropriate calibrations for an aftertreatment system to which they are coupled. Learning modes may include calibration, zeroing and other operations which assist in or provide increased accuracy and/or reduced error in measurement and/or estimation of oxygen levels, and/or in adapting oxygen sensor operation to a mode of system operation.

Engine 12 includes a fuel injection system 90 that is connected with, and controlled by the ECU 28. Fuel injection system 90 delivers fuel into the cylinders of the engine 12. Various types of fuel injection systems may be utilized in the present invention, including, but not limited to, pump-line-nozzle injection systems, unit injector and unit pump systems, high pressure common rail fuel systems, common rail fuel injection systems and others. The timing of the fuel injection, the amount of fuel injected, the number and timing of injection pulses, are preferably controlled by fuel injection system 90 and/or ECU 28.

Figure 3:
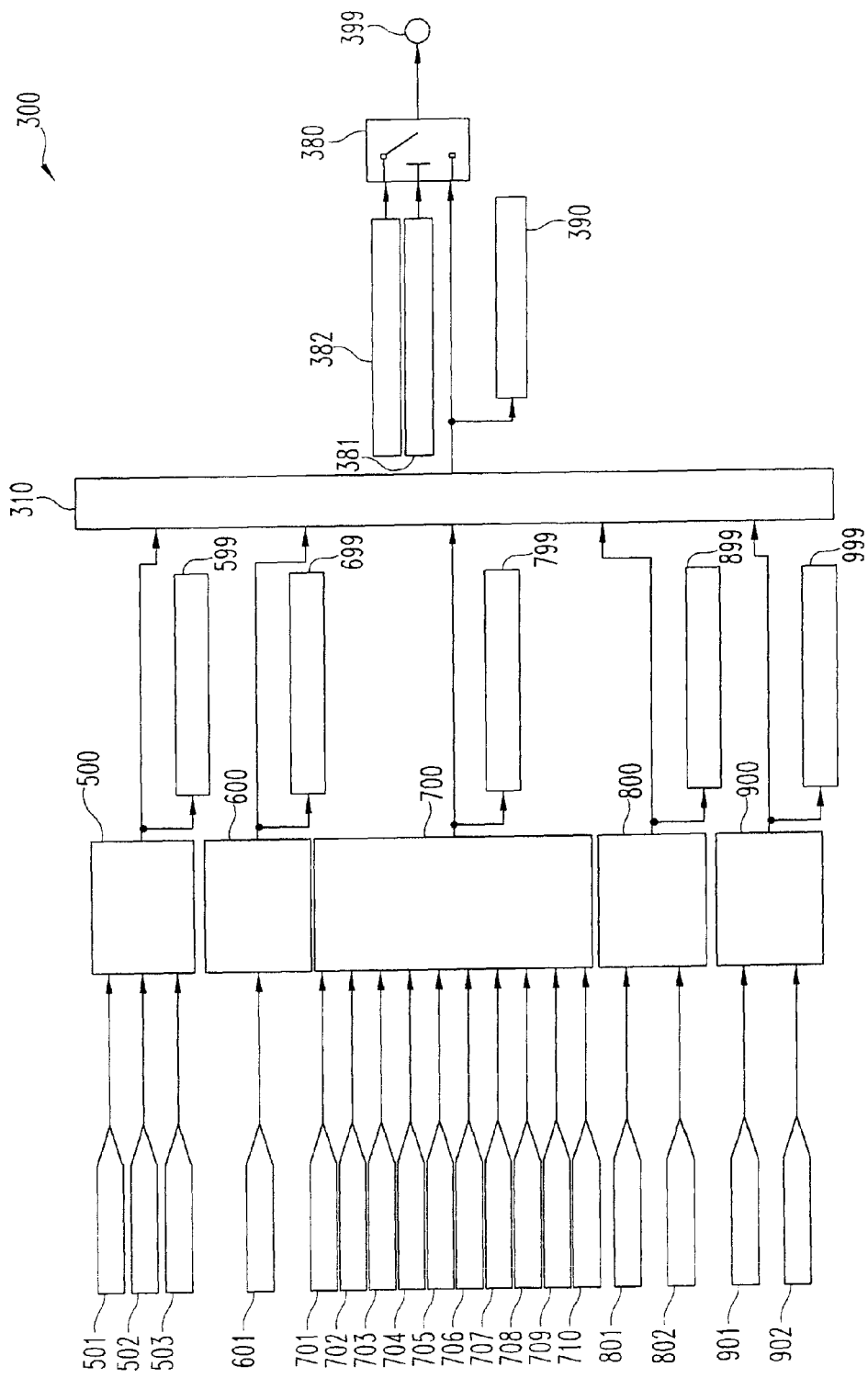
FIG. 3 is a diagram of logic operable in connection with an oxygen sensor.

With reference to FIG. 3, there is illustrated an oxygen sensor learning mode control diagram 300 which can be executed by a controller such as ECU 28. Oxygen sensor learning control diagram 300 includes block 500 which receives inputs 501, 502, and 503, and outputs to variable 599; block 600 which receives input 601, and outputs to variable 699; block 700 which receives inputs 701, 702, 703, 704, 705, 706, 707, 708, 709, and 710, and outputs to variable 799; block 800 which receives inputs 801 and 802, and outputs to variable 899; and block 900 which receives inputs 901 and 902, and outputs to variable 999. Block 500 determines whether the engine is in motoring condition. Block 600 determines whether there has been no regeneration for a specified time period. Block 700 determines whether there are oxygen sensor faults. Block 800 determines whether EGR is overridden. Block 900 determines whether exhaust pressure is within specified limits. Blocks, 500, 600, 700, 800, and 900 and their inputs and outputs are further described below in connection with FIGS. 5, 6, 7, 8, and 9, respectively.

Variables 599, 699, 799, 899, and 999 are provided to conditional 310 which is a Boolean AND operator. Conditional 310 outputs to variable 390, the oxygen autozero flag, which can be used to control whether the oxygen sensors enter learning mode or autozero. Variable 390 is provided to the bottom input of switch 380. Variable 382 is provided to the top input of switch 380. Variable 382 is an autozero override value. Variable 381 is provided to the select input of switch 380. Variable 381 is an autozero override. When variable 381 is false switch 380 will output the value of its bottom input. When variable 381 is true switch 380 will output the value of its top input. The output of switch 380 is provided to variable 399, the autozero command variable. When the value of variable 399 is false the learning mode or autozero mode will not run. When the value of variable 399 is true the learning mode or autozero mode will run.

Figure 4:
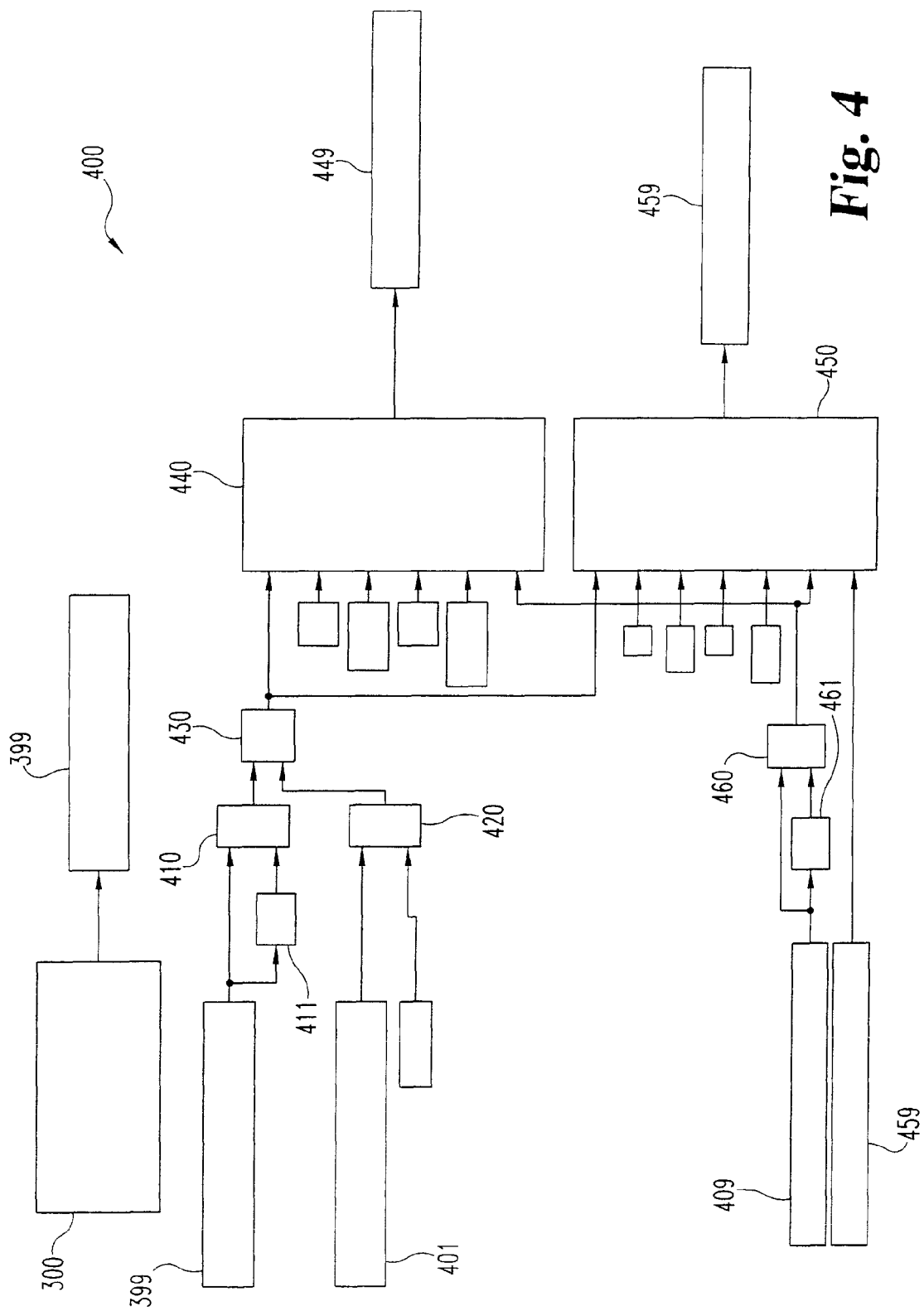
FIG. 4 is a diagram of counter logic operable in connection with an oxygen sensor.

With reference to FIG. 4, there is illustrated a diagram of autozero counter logic 400. Variable 399, the Smart_O2_AutoZero_Command variable, is provided to conditional 410 and to debounce 411 the output of which is also provided to conditional 410. When the conditions are satisfied for an O2 learn incident, variable 399 is true. Conditional 410 detects the presence of a rising edge by testing whether variable 399>the output of debounce 411. The output of conditional 410 is provided to conditional 430.

Variable 401, the time since engine start, is provided to conditional 420 which tests whether variable 401>=30 (or another threshold time). The output of conditional 420 is provided to conditional 430. Conditional 430 is a Boolean AND the output of which is provided to the increment condition input of counter 440 and to the increment condition input of counter 450. An increment value is provided to the increment value input of counter 440, and the decrement condition and decrement value inputs of counter 440 are disabled. In other embodiments, counter 440 could be configured to decrement. A max limit value is provided to max limit input of counter/timer 440. The output of counter 440 is provided to variable 449. If a rising edge is detected, and the time since engine start is 30 minutes or greater, the count is increment by 1, since under these conditions the sensor should learn.

Variable 409, a counter reset variable, is provided to conditional 460 and to debounce 461 the output of which is also provided to conditional 460. Conditional 460 tests whether variable 409>the output of debounce 461. The output of conditional 460 is provided to the reset inputs of counter 440 and counter 450. An increment value is provided to the increment value input of counter 450, and the decrement condition and decrement value inputs of counter 450 are disabled. In other embodiments, counter 450 could be configured to decrement. A max limit value is provided to max limit input of counter 440. The output of counter 440 is provided to variable 449 which is provided to the powerdown preset input of counter 450. The powerdown preset set the counter output to the powerdown value, no matter what input is. Variable 449, the V_Smart_O2_AutoZero_Count variable, is a count of how many times that an oxygen sensor has learned in a current drive cycle. Variable 459, the P_Smart_O2_AutoZero_Count, is a count of how many times that an oxygen sensor has learned in total. Variable 459 can be used to enable a mass air flow or MAF learn process.

Figure 5:
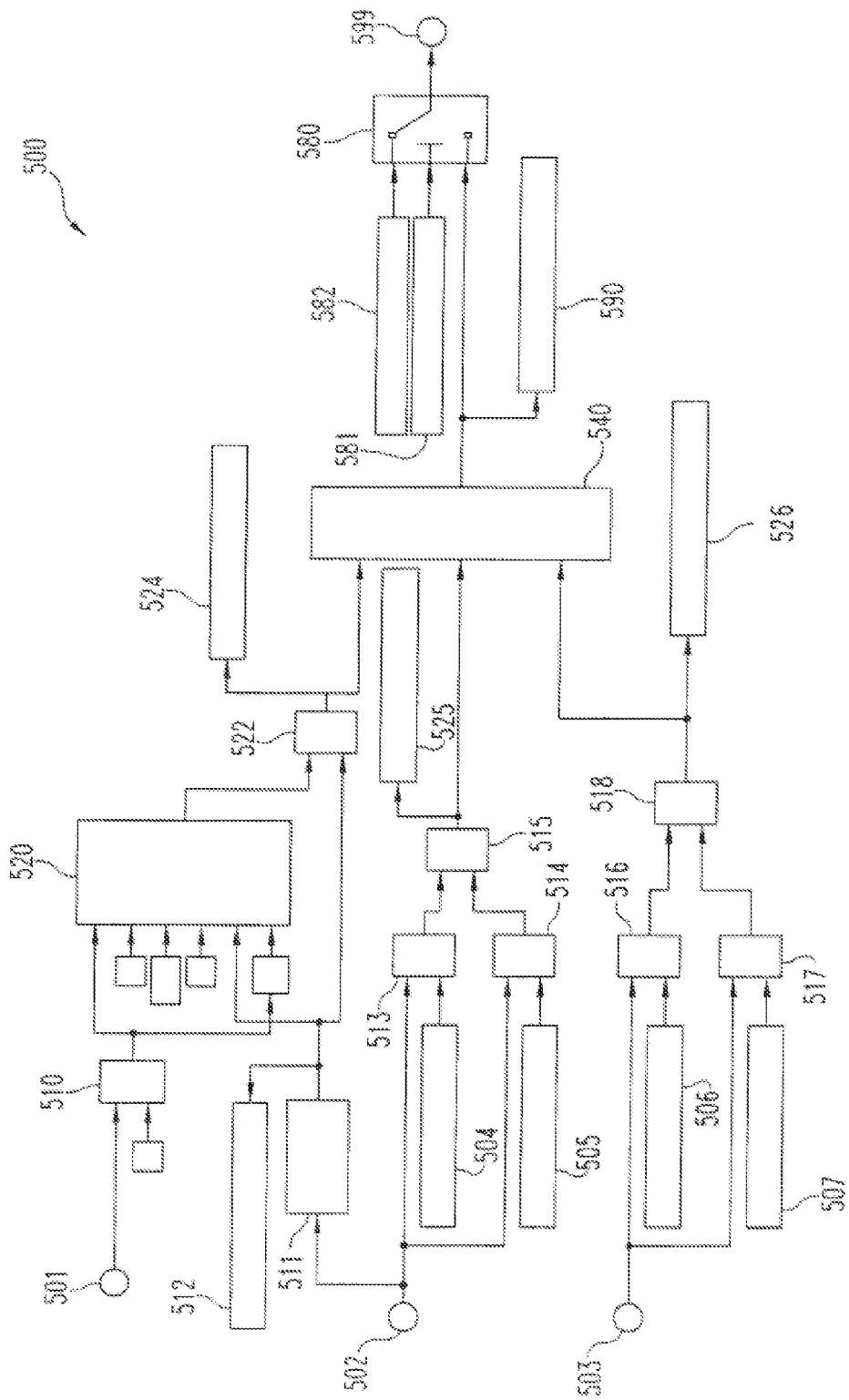
FIG. 5 is a diagram of block 500 of FIG. 3.

With reference to FIG. 5, there is illustrated a diagram of block 500 which is operable to determine whether engine motoring conditions meet fueling, engine speed, and fresh air flow criteria. For example, one embodiment requires that engine speed has been greater than 400 rpm for 30 minutes, engine temperature has been greater than 80° C. for 30 minutes, and engine fueling is zero.

Variables 501, 502, and 503 are input to block 500. Variable 501 is a function of the cylinder fueling. Variable 501 is provided to conditional 510. Conditional 510 tests whether variable 501=zero. The output of conditional 510 is provided to the increment condition input of counter/timer 520 and the inverse of the output of conditional 510 is provided to the reset input of counter/timer 520. An increment value is provided to the increment value input of counter/timer 520, and the decrement condition and decrement value inputs of counter/timer 520 are disabled. In other embodiments, counter/timer 520 could be configured to decrement. Variable 512, the no fuel time max, is provided to the max limit input of counter/timer 520 and to conditional 522. The counter output of counter/timer 520 is provided to conditional 522. Conditional 522 tests whether the output of counter/timer 520 is >=variable 512. The output of conditional 522 is provided to variable 524, the no fuel flag, and to conditional 540.

Variable 502 is a function of filtered engine speed. Variable 502 is provided to conditional 513, conditional 514, and two-dimensional lookup table 511. Two-dimensional lookup table 511 outputs a no fuel time value to variable 512 based upon the engine speed value received at its input. Conditional 513 tests whether variable 502<=variable 504. Variable 504 is a maximum threshold for engine speed. Conditional 514 tests whether variable 502>=variable 505. Variable 505 is a minimum threshold for engine speed. The output of conditional 513 and the output of conditional 514 are provided to conditional 515. Conditional 515 is a Boolean AND operator. The output of conditional 515 is provided to variable 525. Variable 525 is true when variable 502 is within the maximum threshold and within the minimum threshold, and otherwise false. The value of variable 525 is provided to conditional 540.

Variable 503 is a function of fresh air flow. Variable 503 is provided to conditional 516 and conditional 517. Conditional 516 tests whether variable 503<=variable 506. Variable 506 is a maximum threshold for fresh air flow. Conditional 517 tests whether variable 503>=variable 507. Variable 507 is a minimum threshold for fresh air flow. The output of conditional 516 and the output of conditional 517 are provided to conditional 518. Conditional 518 is a Boolean AND operator. The output of conditional 518 is provided to variable 526, the air flow in range variable. Variable 526 is true when variable 503 is within the maximum threshold and within the minimum threshold, and otherwise false. The value of variable 526 is provided to conditional 540.

Conditional 540 is a Boolean AND operator. The output of conditional 540 is provided to the bottom input of switch 580. Variable 582 is provided to the top input of switch 580. Variable 582 is an engine motoring override value. Variable 581 is provided to the select input of switch 580. Variable 581 controls engine motoring override. When variable 581 is false switch 580 will output the value of its bottom input 590. When variable 581 is true switch 580 will output the value of its top input 582. The output of switch 580 is provided to variable 599, the engine motoring flag, which is output from block 500 as illustrated and described above in connection with FIG. 3.

Figure 6:
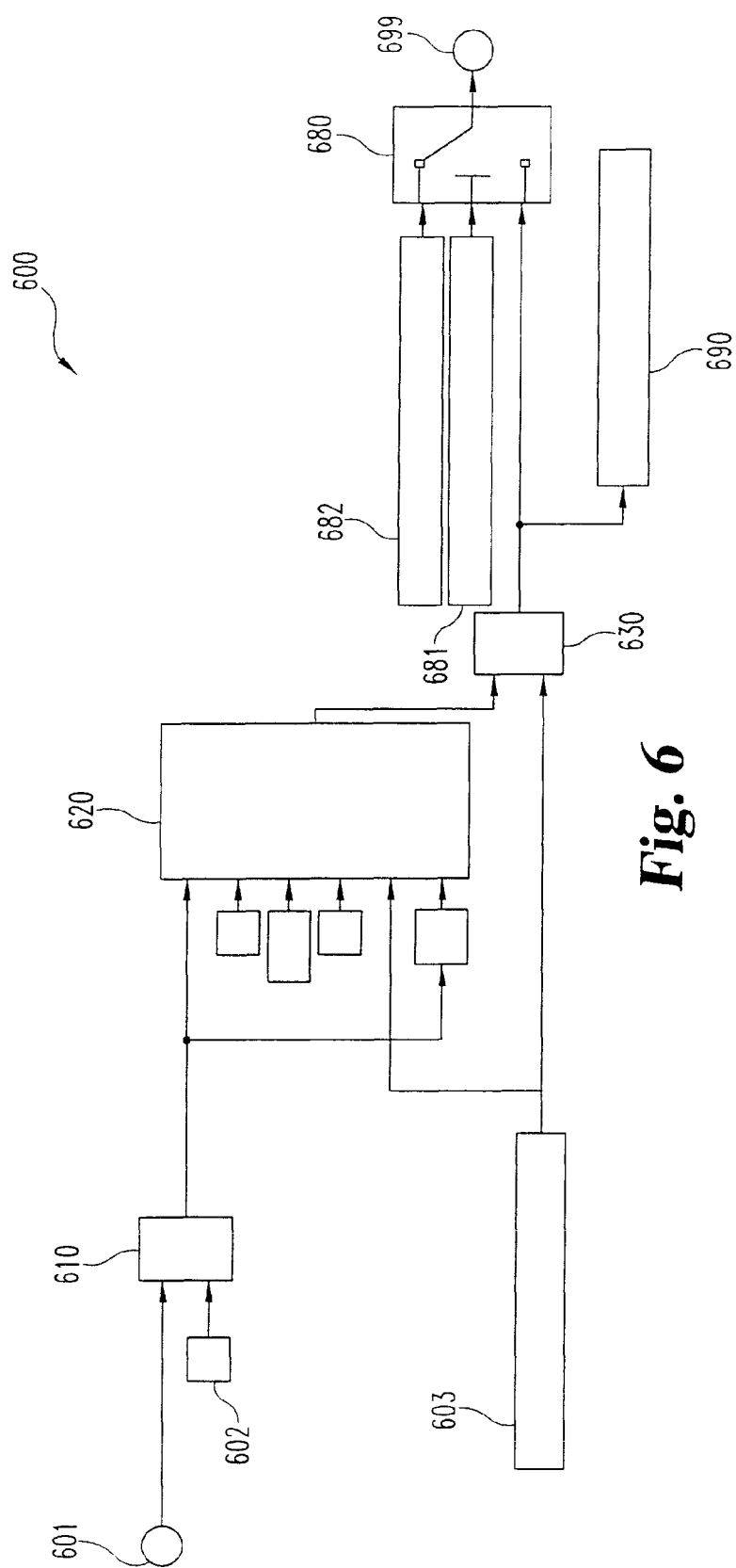
FIG. 6 is a diagram of block 600 of FIG. 3.

With reference to FIG. 6, there is illustrated a diagram of block 600 which is operable to determine whether there have been no regenerations for at least a threshold period of time, for example, 20 seconds. Variable 601, which is a function of the operating mode, is input to block 600. Conditional 610 tests whether variable 601=variable 602. Variable 602 is a value which indicates that the operating mode is not a regeneration operating mode.

The output of conditional 610 is input to the increment condition input of counter/timer 620. An increment value is provided to the increment value input of counter/timer 620, and the decrement condition and decrement value inputs of counter/timer 620 are disabled. In other embodiments, counter/timer 620 could be configured to decrement. The inverse of the output of conditional 610 is input to the reset input of counter/timer 620. Variable 603 is a no regeneration time threshold value which is input to the max limit input of counter/timer 620 and to conditional 630. Conditional 630 tests whether the counter output of counter/timer 620>=variable 603 and outputs the result.

The output of conditional 630 is provided to variable 690 and to the bottom input of switch 680. Variable 682 is provided to the top input of switch 680. Variable 682 is a no regeneration override value. Variable 681 is provided to the select input of switch 680. Variable 681 controls the no regeneration override. When variable 681 is false switch 680 will output the value of its bottom input. When variable 681 is true switch 680 will output the value of its top input. The output of switch 680 is provided to variable 699, the no regeneration flag, which is output from block 600 as illustrated and described above in connection with FIG. 3.

Figure 7:
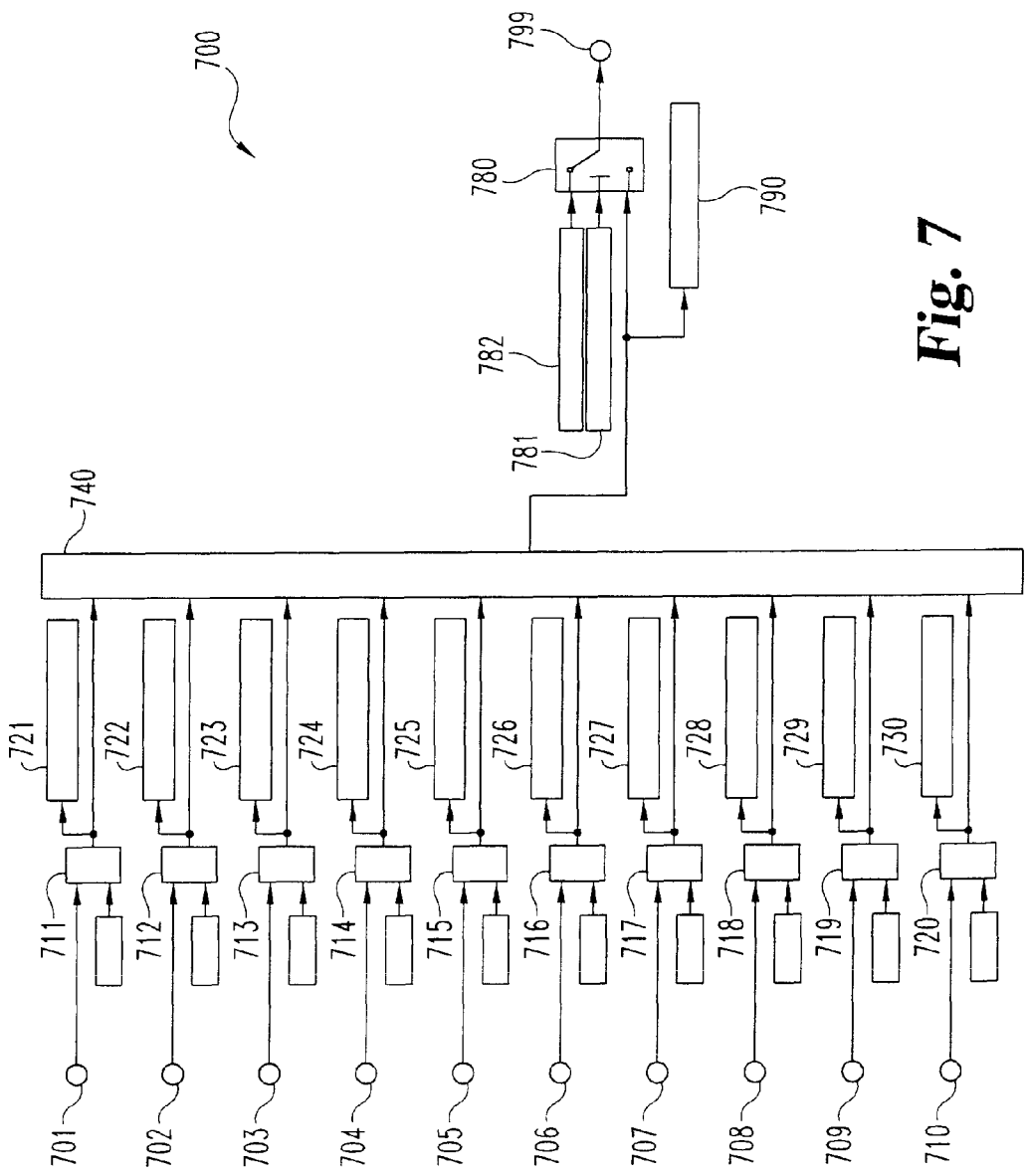
FIG. 7 is a diagram of block 700 of FIG. 3.

With reference to FIG. 7, there is illustrated a diagram of block 700 which is operable to determine whether any oxygen sensor faults are true. Variables 701, 702, 703, 704, 705, 706, 707, 708, 709, and 710 are input to block 700. Variable 701 indicates whether a high threshold rationality error for a first oxygen sensor (such as oxygen sensor 66) is present. Variable 702 indicates whether a low threshold rationality error for the first sensor is present. Variable 703 indicates whether a high threshold rationality error for a second oxygen sensor (such as oxygen sensor 68) is present. Variable 704 indicates whether a low threshold rationality error for the second oxygen sensor is present. Variable 705 indicates whether a sensor error for the first oxygen sensor is present. Variable 706 indicates whether a sensor error for the second oxygen sensor is present. Variable 707 indicates whether a heater error for the first oxygen sensor is present. Variable 708 indicates whether a heater error for the second oxygen sensor is present. Variable 709 indicates whether an oxygen sensor supply voltage error is present. Variable 710 indicates whether a communications interface time out error is present.

Variable 701 is input to conditional 711 which tests whether variable 701=false and outputs the result of the test to flag variable 721 and conditional 740. Variable 702 is input to conditional 712 which tests whether variable 702=false and outputs the result of the test to flag variable 722 and conditional 740. Variable 703 is input to conditional 713 which tests whether variable 703=false and outputs the result of the test to flag variable 723 and conditional 740. Variable 704 is input to conditional 714 which tests whether variable 704=false and outputs the result of the test to flag variable 724 and conditional 740. Variable 705 is input to conditional 715 which tests whether variable 705=false and outputs the result of the test to flag variable 725 and conditional 740. Variable 706 is input to conditional 716 which tests whether variable 706=false and outputs the result of the test to flag variable 726 and conditional 740. Variable 707 is input to conditional 717 which tests whether variable 707=false and outputs the result of the test to flag variable 727 and conditional 740. Variable 708 is input to conditional 718 which tests whether variable 708=false and outputs the result of the test to flag variable 728 and conditional 740. Variable 709 is input to conditional 719 which tests whether variable 709=false and outputs the result of the test to flag variable 729 and conditional 740. Variable 710 is input to conditional 720 which tests whether variable 710=false and outputs the result of the test to flag variable 730 and conditional 740.

Conditional 740 is a Boolean AND operator which is provided to variable 790 and the bottom input of switch 780. Variable 782 is provided to the top input of switch 780. Variable 782 is an oxygen sensor override value. Variable 781 is provided to the select input of switch 780. Variable 781 controls oxygen sensor error override. When variable 781 is false switch 780 will output the value of its bottom input. When variable 781 is true switch 780 will output the value of its top input. The output of switch 780 is provided to variable 799, the oxygen sensor error flag, which is output from block 700 as illustrated and described above in connection with FIG. 3.

Figure 8:
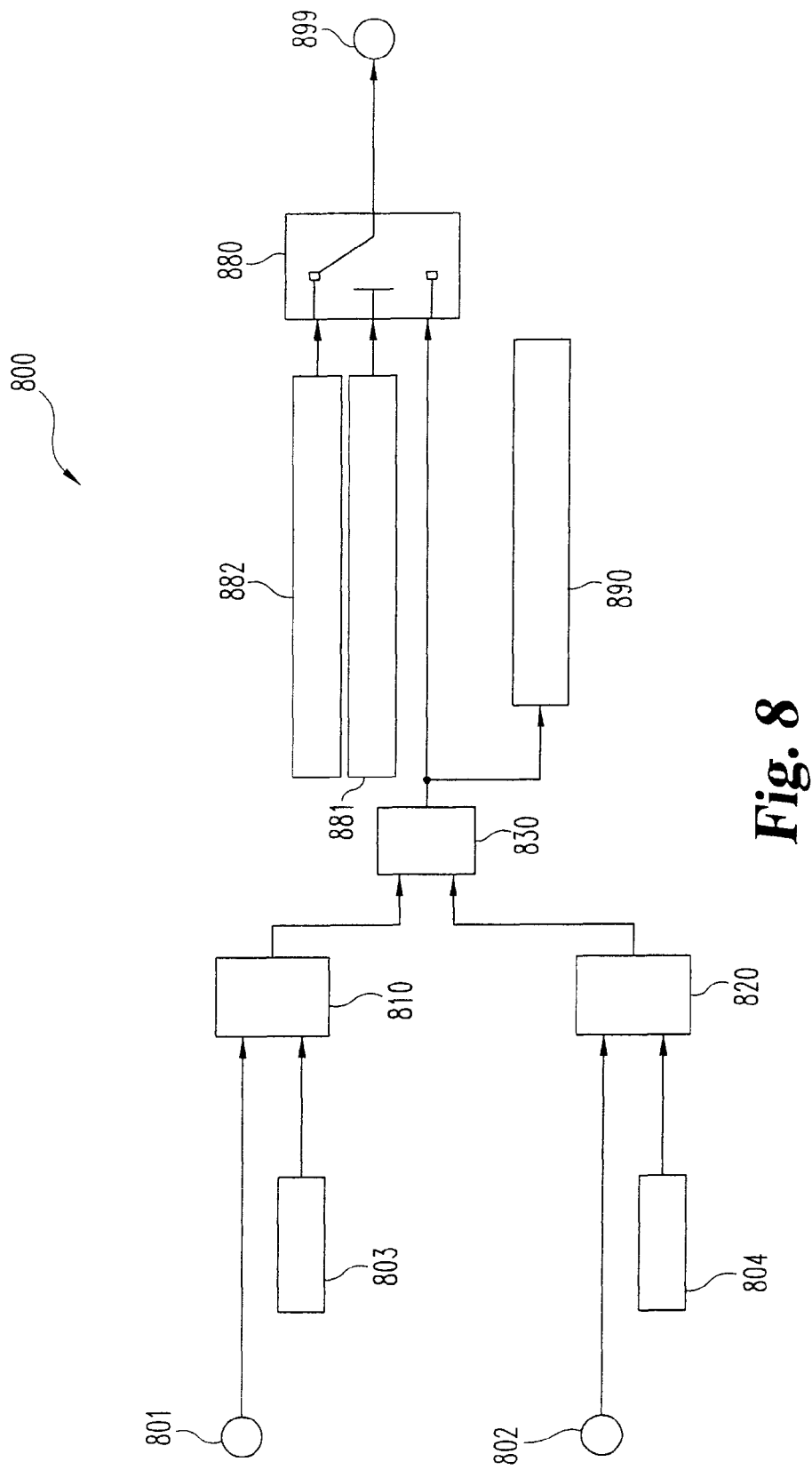
FIG. 8 is a diagram of block 800 of FIG. 3.

With reference to FIG. 8, there is illustrated a diagram of block 800 which is operable to determine whether EGR conditions are in a desired state. Variables 801 and 802 are input to block 800. Variable 801 is a function of whether the EGR valve is closed. Variable 801 is provided to conditional 810. Conditional 810 tests whether variable 801=variable 803.

Variable 803 is the value which indicates that the EGR valve is closed. The output of conditional 810 is provided to conditional 830.

Variable 802 is a function of the source from which the EGR valve position information is determined. Variable 802 is provided to conditional 820. Conditional 820 tests whether variable 802=variable 804. Variable 804 is a value that specifies the desired source of the EGR valve position information. The output of conditional 820 is provided to conditional 830. Conditional 830 is a Boolean AND operator. The output of conditional 830 is provided to variable 890, which stores an EGR condition value.

Variable 890 is provided to the bottom input of switch 880. Variable 882 is provided to the top input of switch 880. Variable 882 is an EGR condition override value. Variable 881 is provided to the select input of switch 880. Variable 881 controls the EGR condition override. When variable 881 is false switch 880 will output the value of its bottom input. When variable 881 is true switch 880 will output the value of its top input. The output of switch 880 is provided to variable 899, the EGR condition flag, which is output from block 800 as illustrated and described above in connection with FIG. 3.

Figure 9:
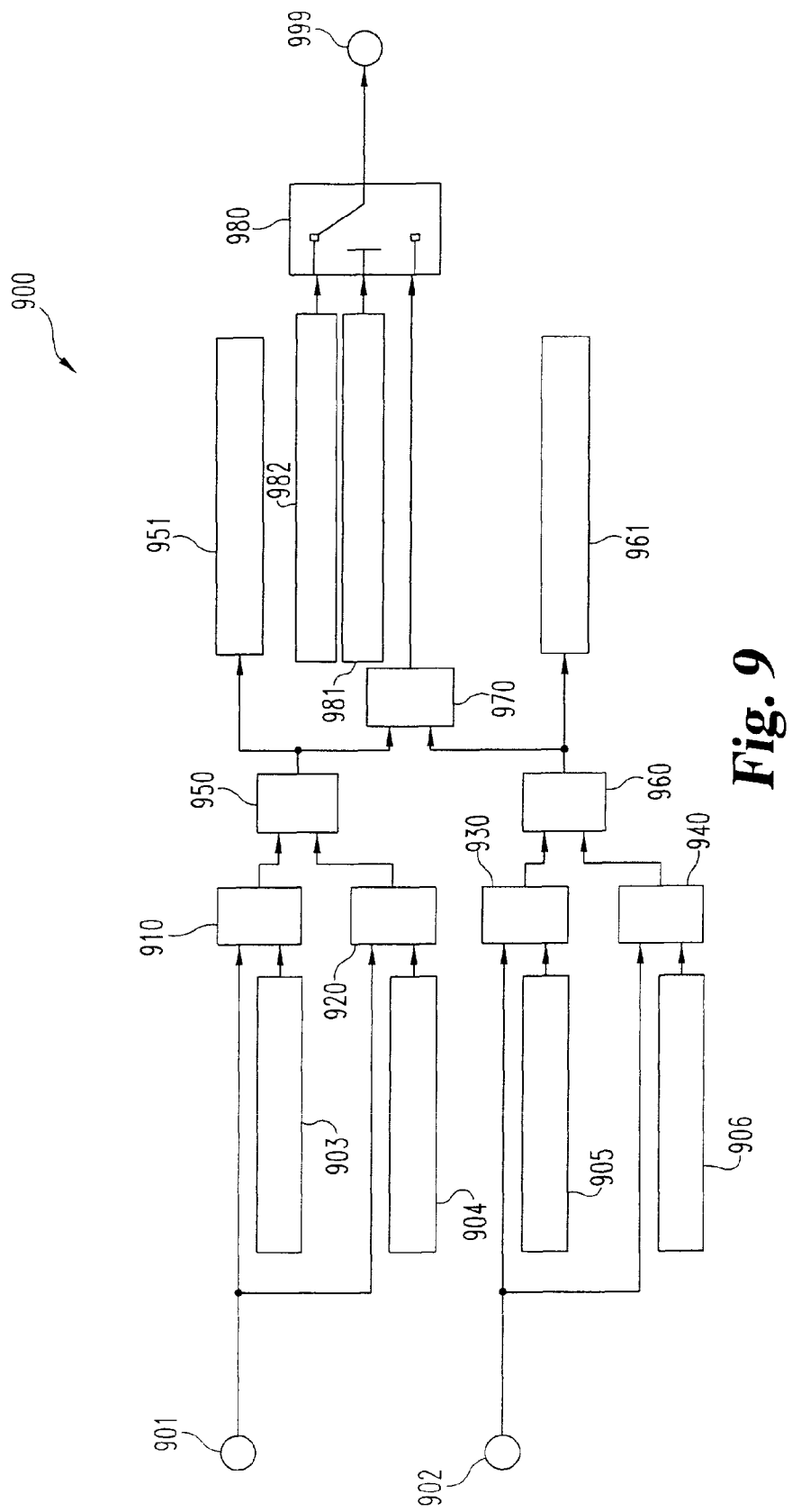
FIG. 9 is a diagram of block 900 of FIG. 3.

With reference to FIG. 9, there is illustrated a diagram of block 900 which is operable to determine whether exhaust pressure conditions are within desired limits. Variables 901 and 902 are input to block 900. Variable 901 is a function of the pressure differential across a diesel particulate filter. Variable 901 is provided to conditional 910 and conditional 920. Conditional 910 tests whether variable 901<=variable 903. Variable 903 is a maximum threshold for the pressure differential across a diesel particulate filter. Conditional 920 tests whether variable 901>=variable 904. Variable 904 is a minimum threshold for the pressure differential across a diesel particulate filter. The output of conditional 910 and the output of conditional 920 are provided to conditional 950. Conditional 950 is a Boolean AND operator. The output of conditional 950 is provided to variable 951. Variable 951 is true when variable 901 is within the maximum threshold and within the minimum threshold, and otherwise false. The value of variable 951 is provided to conditional 970.

Variable 902 is a function of the ambient air pressure. Variable 902 is provided to conditional 930 and conditional 940. Conditional 930 tests whether variable 902<=variable 905. Variable 905 is a maximum threshold for the pressure of the ambient air. Conditional 920 tests whether variable 902>=variable 906. Variable 904 is a minimum threshold for the pressure of the ambient air. The output of conditional 930 and the output of conditional 940 are provided to conditional 960. Conditional 960 is a Boolean AND operator. The output of conditional 960 is provided to variable 961. Variable 961 is true when variable 902 is within the maximum threshold and within the minimum threshold, and otherwise false. The value of variable 961 is provided to conditional 970.

Conditional 970 is a Boolean AND operator. The output of conditional 970 is provided to the bottom input of switch 980. Variable 982 is provided to the top input of switch 980. Variable 982 a pressure condition override value. Variable 981 is provided to the select input of switch 980. Variable 981 controls a pressure condition override. When variable 981 is false switch 980 will output the value of its bottom input. When variable 981 is true switch 980 will output the value of its top input. The output of switch 980 is provided to variable 999, the pressure condition flag, which is output from block 900 as illustrated and described above in connection with FIG. 3.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
   evaluating a regeneration event condition;
   evaluating a pressure condition;
   evaluating an EGR mode condition, wherein the EGR mode condition includes evaluation of an information of EGR valve position and evaluation of a source of the information of EGR valve position; and
   controlling initiation of an oxygen sensor learning mode based upon the evaluating a regeneration event condition, the evaluating a pressure condition, and the evaluating an EGR mode condition.

2. A method according to claim 1 wherein the regeneration event condition includes evaluation of whether time since a regeneration event has exceeded a time threshold.

3. A method according to claim 1 wherein the evaluating a pressure condition includes evaluating a pressure differential across a diesel particulate filter.

4. A method according to claim 1 wherein the evaluating a pressure condition includes evaluating ambient pressure.

5. A system comprising:
   an exhaust aftertreatment subsystem;
   an oxygen sensor coupled to the exhaust aftertreatment subsystem; and
   a controller operable to command the oxygen sensor to enter a learning mode when an EGR condition is satisfied, wherein the EGR condition includes evaluation of information of EGR valve position and evaluation of a source of the information of EGR valve position, and wherein the EGR condition is satisfied when the EGR valve position is a closed position and the source of the information of EGR valve position is an expected source.

6. A system according to claim 5 wherein entry into the learning mode further requires an exhaust pressure condition is satisfied.

7. A system according to claim 5 wherein entry into the learning mode further requires a regeneration condition is satisfied, an exhaust pressure condition is satisfied, an EGR override condition is satisfied, and an oxygen sensor fault condition is satisfied.

8. A system according to claim 5 wherein entry into the learning mode further requires that at least 20 seconds have passed since a regeneration event of the aftertreatment subsystem.

9. A system according to claim 5 wherein entry into the learning mode further requires determination or evaluation of whether at least one of the following errors is associated with the oxygen sensor: a high threshold rationality error, a low threshold rationality error, temperature error, a heater error, a supply voltage error, and a communications interface timeout error.

10. A system according to claim 5 wherein the learning mode includes executing instructions to reduce error of a measurement by the oxygen sensor.

11. A system according to claim 5 wherein the learning mode includes adjusting the oxygen sensor according to one or more engine operating conditions.

12. A system according to claim 5 wherein entry into the learning mode further requires determination of:
whether a high threshold rationality error for the oxygen sensor is present;
whether a low threshold rationality error for the oxygen sensor is present;
whether a temperature error for the oxygen sensor is present;
whether a heater error for the oxygen sensor is present;
whether a supply voltage error for the oxygen sensor is present; and
whether a communications interface timeout error is present.

13. A system according to claim 5 wherein entry into the learning mode further requires determination or evaluation of a pressure differential across a diesel particulate filter.

14. A computer program product stored on a computer readable medium, the computer program product comprising instructions that, when executed by a computer, cause the computer to:

evaluate a regeneration conditional;

evaluate an exhaust gas recirculation conditional; and control initiation of an oxygen sensor learning mode based upon the evaluating the regeneration conditional and the evaluating the exhaust gas recirculation conditional, wherein the evaluating the exhaust gas recirculation conditional includes evaluating information of an exhaust gas recirculation valve position and a source of information of the exhaust gas recirculation valve position, and wherein the initiation of an oxygen sensor learning mode requires at least that the exhaust gas recirculation valve position is a closed position.

15. The computer program product of claim 14, wherein the evaluating the regeneration event conditional includes evaluating whether a time since a regeneration event has exceeded a time threshold.

16. The computer program product of claim 14, wherein the evaluating the exhaust gas recirculation conditional includes evaluating an exhaust gas recirculation valve position.

17. The computer program product of claim 14, wherein the instructions, when executed by a computer, further cause the computer to evaluate a pressure condition and further control initiation of the oxygen sensor learning mode based upon the evaluating the pressure condition.

* * * * *